(12) United States Patent
Ritchie et al.

(10) Patent No.: US 11,703,740 B2
(45) Date of Patent: Jul. 18, 2023

(54) DECOUPLABLE FOCAL DISTANCE CONTROLLER AND INDICATOR

(71) Applicant: Focusbug Technologies Inc., Bowen Island (CA)

(72) Inventors: Jonathan Duncan Ritchie, Bowen Island (CA); Laird Alexander Pierce, Vancouver (CA)

(*) Notice: Subject to any disclaimer, the term of this patent is extended or adjusted under 35 U.S.C. 154(b) by 0 days.

(21) Appl. No.: 17/636,514

(22) PCT Filed: Nov. 8, 2021

(86) PCT No.: PCT/CA2021/051589
§ 371 (c)(1),
(2) Date: Feb. 18, 2022

(87) PCT Pub. No.: WO2022/094727
PCT Pub. Date: May 12, 2022

(65) Prior Publication Data
US 2022/0365404 A1 Nov. 17, 2022

(30) Foreign Application Priority Data
Nov. 9, 2020 (CA) .................................. CA3098717

(51) Int. Cl.
G03B 3/12 (2021.01)
G03B 3/02 (2021.01)
G03B 17/18 (2021.01)
H04N 23/67 (2023.01)

(52) U.S. Cl.
CPC ................. G03B 3/12 (2013.01); G03B 3/02 (2013.01); G03B 17/18 (2013.01); H04N 23/67 (2023.01)

(58) Field of Classification Search
CPC . G03B 3/12; G03B 3/02; G03B 17/18; H04N 23/67; H04N 23/66
USPC ........................................................ 348/345
See application file for complete search history.

(56) References Cited

U.S. PATENT DOCUMENTS

| | | | |
|---|---|---|---|
| 8,718,462 B2 | 5/2014 | Voss | |
| 8,982,272 B1 | 3/2015 | Preston | |
| 9,648,225 B1* | 5/2017 | Preston | ................. H04N 23/57 |
| 10,317,775 B2 | 6/2019 | Fisher | |
| 2003/0025802 A1 | 2/2003 | Mayer | |
| 2008/0225234 A1 | 9/2008 | Bauer | |
| 2011/0026135 A1 | 2/2011 | Fujiwara | |

(Continued)

FOREIGN PATENT DOCUMENTS

| CA | 2962977 | 11/2017 |
|---|---|---|
| DE | 202020105870 | 10/2020 |

*Primary Examiner* — Stephen P Coleman
(74) *Attorney, Agent, or Firm* — Damien G. Loveland (57) ABSTRACT

When filming a scene, the focal distance of the video camera is often controlled remotely, and can be switched between manual and autofocus modes. To overcome sudden movements in the lens upon reverting to manual mode, and to avoid disrupting a user's grip on the manual control during autofocus, the traditional distance ring indicator is split into separate controller and indicator components. The controller permits manual input, while the indicator tracks the desired distance. In manual mode, the controller and indicator move in unison. In autofocus mode, the indicator tracks a rangefinder input but the controller is not moved. In a hybrid mode, the controller offsets the rangefinder input. In all cases, the position of the lens moves with the indicator.

12 Claims, 5 Drawing Sheets

(56) References Cited

U.S. PATENT DOCUMENTS

2012/0328276 A1  12/2012  Toyama
2018/0046062 A1* 2/2018  Fisher .................... H04N 23/66
2022/0113493 A1  4/2022   Voss

* cited by examiner

DECOUPLABLE FOCAL DISTANCE CONTROLLER AND INDICATOR

TECHNICAL FIELD

The present disclosure relates to the control of a camera. More specifically, it relates to focal distance control.

BACKGROUND

In motion picture environments, one important function is camera focus. This process is typically performed manually by the first camera assistant or focus puller. Focus pulling may involve changing the camera lens's focal distance setting in correspondence with a moving subject's physical distance from the camera. Additionally, it may involve shifting focus from one subject to another within the frame. It may also involve deliberately blurring the focus for cinematographic effect. As there is little room for error, and next to no possibility of fixing errors, the job of the first camera assistant can therefore be very difficult.

A first camera assistant may use a handset that is separate from, but communicatively connected to, the camera for focus pulling. A typical handset may include a knob on which focal distances are marked. As the knob is rotated, a signal is transmitted to a lens motor assembly on the camera that rotates the focus ring according to the rotational position of the knob.

Sometimes, the first camera assistant may use a rangefinder, the output of which is connected to the handset. In this situation, the output of the rangefinder is transmitted via the handset to the lens motor assembly on the camera to control the focal distance of the camera, thereby acting as an autofocus system. While in autofocus mode, there is no user control of the position of the lens via the handset. A button on the handset may be pressed to switch it from the manual mode to the autofocus mode. When autofocus is engaged, the lens goes straight to the distance indicated by the rangefinder and stays there until the button is released, at which point the lens returns suddenly to the position shown by the knob on the handset.

Patent number U.S. Ser. No. 10/317,775 to Fisher et al. discloses a system in which a unitary knob assembly on the handset spins according to the position of the distance ring on the camera, when the camera is in autofocus mode. A user may override the autofocus function by physically enforcing the position of the knob against the motors trying to control it according to a rangefinder distance.

Patent number U.S. Pat. No. 8,718,462 to Voss discloses a rotational control unit that has a manual control knob aligned with a cylindrical digital display, which is configured to display a variety of different scales. The display is either fixed to a base, or fixed to the knob.

This background information is provided to reveal information believed by the applicant to be of possible relevance to the present invention. No admission is necessarily intended, nor should be construed, that any of the preceding information constitutes prior art against the present invention.

SUMMARY OF INVENTION

In a lens control system, the present invention separates the traditional distance ring indicator into two components that may either operate in unison or independently. These components are a manual controller and a distance indicator. This allows for three modes of control, which are full manual control of the focal distance, full autofocus control of the focal distance, and hybrid control of the focal distance in which manual tweaks can be made in real time to autofocus settings.

The indicator tracks the lens's focal length setting, and is motorized so that its position follows that of the lens's focal length setting when in autofocus mode. When in autofocus mode, the manual controller is not moved, which allows a user's grip on it to be maintained without disruption.

Disclosed herein is a remote control system for a camera with a lens that has a focusing mechanism, the remote control system comprising: a distance indicator configured to indicate a focal length of the lens; and a manual controller, which in a first mode controls the distance indicator and the focusing mechanism, and in a second mode is operably decoupled from the distance indicator and the focusing mechanism to allow an autofocus controller to control the distance indicator and the focusing mechanism. In some embodiments, the manual controller in a third mode is partially decoupled from the distance indicator and the focusing mechanism to allow the autofocus controller to set the distance indicator and the focusing mechanism to a base setting; and offsets the distance indicator and the focusing mechanism from the base setting.

Also disclosed herein is a method for remotely controlling a focusing mechanism of a camera, the method comprising, in a first mode: receiving a manual input from a manual controller; and setting a distance indicator and the focusing mechanism according to the manual input; and in a second mode: decoupling the manual controller from the distance indicator and the focusing mechanism; receiving an autofocus input from a rangefinder; and setting the distance indicator and the focusing mechanism according to the autofocus input. In some embodiments, the method comprises, in a third mode: receiving an autofocus input from a rangefinder; setting the distance indicator and the focusing mechanism to a base setting according to the autofocus input; receiving an offset input from the manual controller; and offsetting the distance indicator and the focusing mechanism from the base setting according to the offset input.

BRIEF DESCRIPTION OF DRAWINGS

The following drawings illustrate embodiments of the invention and should not be construed as restricting the scope of the invention in any way.

DETAILED DESCRIPTION

A. Glossary

First camera assistant, informally known as a focus puller—The main responsibility of the first camera assistant is to ensure that the desired subject stays in focus during a take. This is done by any means available that works for that person, including relying on preset marks and estimating distances visually, using rangefinder data, watching a video monitor and adjusting focus by eye, estimation and any combination of the foregoing.

LCS, or lens control system—This is a system that provides the control for turning the lens focus barrel on a camera remotely via a wired or more usually a wireless communication connection. An LCS usually includes geared motors that are attached to the camera and physically turn the lens barrel, and a handset that is remote from the camera. The handset is the user interface and usually has a distance ring indicator, i.e. a knob marked with a distance scale. In the present invention, however, the knob and distance scale are separate. Turning the knob on the handset commands the motors on the lens to set the focus to the desired distance.

Distance ring indicator—a knob marked with a distance scale, typically used to control the focal length of a camera. A distance ring indicator may either be on a camera or on a handset of a lens control system for the camera. In the present invention, however, a distance indicator is used which is separate from the knob, and is normally not used to control the focal length.

The term "manual controller" refers to any physical component that may be manipulated by hand to provide an input signal. A manual controller may be a knob, a handle, a lever or a slide, for example, or it may be a component displayed on a touchscreen interface.

Rangefinder—Any device used to measure the distance between the camera and the subject and report that distance back (a) to a first camera assistant, who then uses that information to manually turn the LCS knob, or (b) via serial data lines directly to the LCS to enable an autofocus mode in which the lens motor automatically turns to set the lens to the commanded distance. The distance may reported back (c) to the first camera assistant and the LCS simultaneously.

Autofocus—Using rangefinder or other data to control the lens focus, completely or largely without input from the focus puller.

The term "firmware" includes, but is not limited to, program code and data used to control and manage the interactions between the various modules of the system.

The term "hardware" includes, but is not limited to, the physical housing for a module, a display screen, connectors, wiring, circuit boards having processor and memory units, power supply, and other electrical or electronic components.

The term "module" can refer to any component in this invention and to any or all of the features of the invention without limitation. A module may be a software, firmware or hardware module, and may be located in a user device or a device connected to a user device, a camera or a device connected to the camera.

The term "network" can include both a mobile network and data network without limiting the term's meaning, and includes the use of wireless (e.g. 2G, 3G, 4G, 5G, WiFi, WiMAX™, Wireless USB (Universal Serial Bus), Zigbee™, Bluetooth™ and satellite), and/or hard wired connections such as local, internet, ADSL (Asymmetrical Digital Subscriber Line), DSL (Digital Subscriber Line), cable modem, T1, T3, fibre, dial-up modem, television cable, and may include connections to flash memory data cards and/or USB memory sticks where appropriate. A network could also mean dedicated connections between computing devices and electronic components, such as buses for intra-chip communications.

The term "microprocessor" or "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or separate from each other. The term includes virtual processors and machine instances as in cloud computing or local virtualization, which are ultimately grounded in physical processors.

The term "software" includes, but is not limited to, program code that performs the computations necessary for detecting user or sensor inputs, displaying information, converting data and generating output control signals.

The term "system" when used herein without qualification refers to a lens control system that includes a manual controller and distance indicator set, the set being the subject of the present invention. The system is able to control a camera lens based on manual input, autofocus input or a combination thereof.

The term "real-time" means that as one action is occurring, another action is occurring in response to it and at the same time, subject to inherent time lags due to electronic and mechanical limitations. The actions may appear to a human to be simultaneous, or to be close enough together that their occurrences are, for substantially all intents and purposes, as good as simultaneous.

B. Exemplary Embodiment

Figure 1:
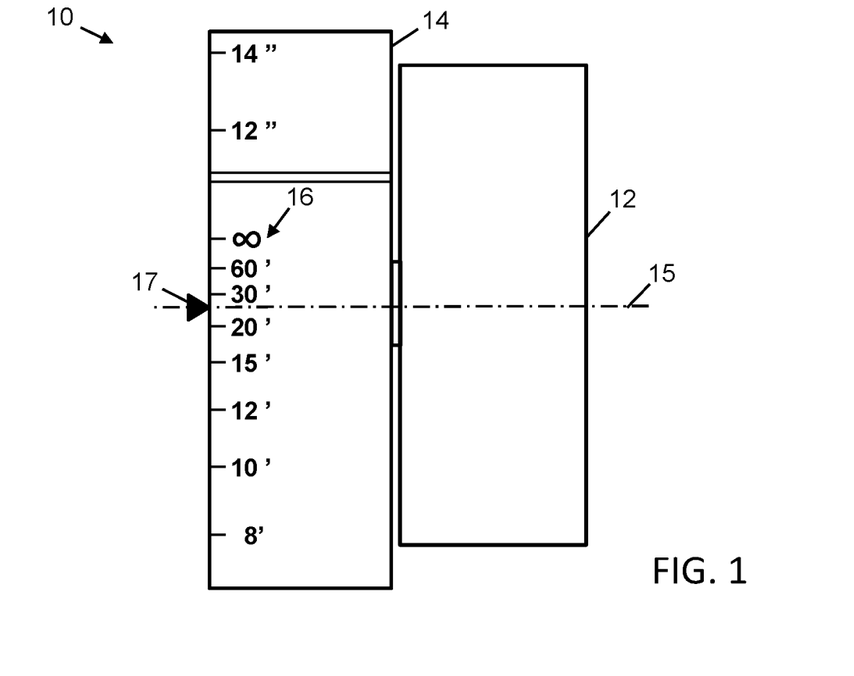
FIG. 1 is a schematic diagram showing a controller and indicator set according to an embodiment of the present invention.

Referring to FIG. 1, there is shown an exemplary controller and indicator set 10. In the set 10, the controller is a focal distance control knob 12 that is decouplable, in terms of control, from the indicator 14, which is a focal distance indicator. The indicator 14 tracks the focal distance setting of the lens on a camera that is remote from the controller and indicator set 10.

In this embodiment, the knob 12 is cylindrical and is rotatable about its axis 15. The indicator 14 is also cylindrical and rotates about the same axis 15, and it has a focal distance scale 16 marked on it. A marker 17, which is in a fixed position relative to the angular position of the indicator 14, points to a distance on the distance scale 16 set by position of the indicator. The marker 17 may be engraved in the body of a handset to which the controller and indicator set is mounted or otherwise incorporated. The knob 12 and the indicator 14 are mechanically free to rotate independently of each other. However, depending on the mode of the controller and indicator set 10, the rotational position of the indicator 14 may be either coupled to or decoupled from the rotational position of the knob 12.

When the knob 12 and indicator 14 are coupled, the focal distance setting of the camera may be controlled by the knob. When the knob 12 and indicator 14 are decoupled, the focal distance setting of the camera may be controlled by an autofocus device, such as a rangefinder, which is connected to the set 10 so that it can control the rotational position of the indicator and the setting of the lens. By allowing the rangefinder to adjust the position of the indicator 14, the indicator shows the position of the lens on the camera so that the focal distance of the camera lens corresponds to both the distance shown by the distance scale 16 and the distance measured by the rangefinder.

The controller and indicator set 10 includes an encoder that senses the rotational position of the knob 12, an encoder that senses the rotational position of the indicator 14, and a motor that rotates the indicator. The knob 12 is non-motorized and serves only as an input device that a first camera assistant or other operator would use. The indicator 14 is not normally intended to be controlled directly by hand, not even to adjust the focal distance when an autofocus mode is being used, nor to return the system from autofocus mode to manual mode. However, it may be controlled in some embodiments by a physical connection with a knob.

Figure 2:
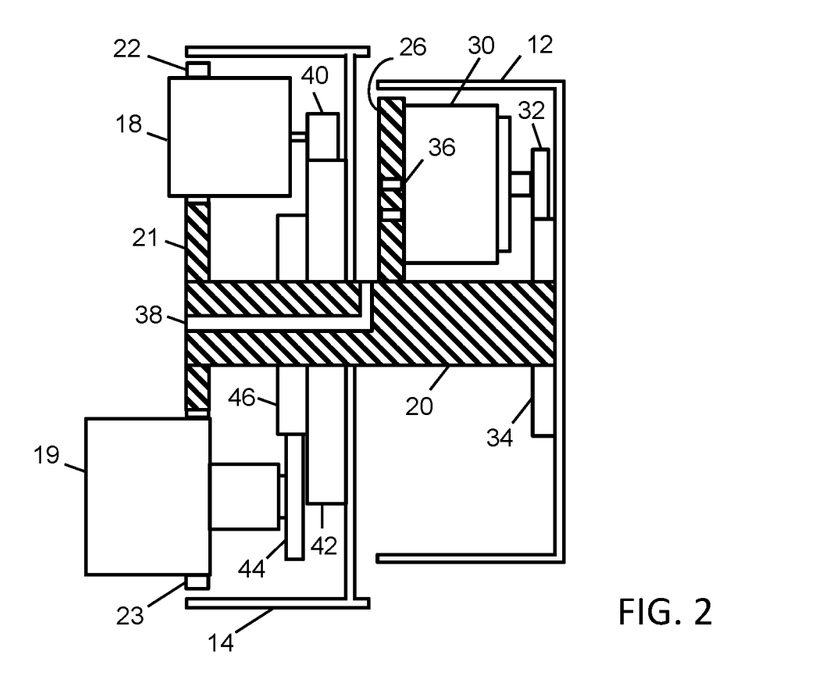
FIG. 2 is a schematic cross-sectional diagram of the controller and indicator set according to an embodiment of the present invention.

Referring to FIG. 2, detail of the interior of the controller and indicator set 10 is shown. A fixed shaft 20 is mounted in or on a backplate 21. Slots 22, 23 in the backplate 21 provide mounting areas for an encoder 18 and motor 19 respectively. The encoder 18 is a rotational encoder that detects the rotational position of the indicator 14. Motor 19 is used to move the indicator 14 to a desired rotational setting. A plate 26 extending from the shaft 20 provides a mount for encoder 30, which detects the rotational position, or changes in the rotational position of the knob 12 from when the system is switched on or from when manual mode is entered.

The encoders 18, 30 may be the same or different parts, but with similar functionality. The means by which they encode the angular position might differ (optical, magnetic, etc.), but the output will basically be a digital interpretation of the rotational angle either way. The encoders 18, 30 cover the 360° span and may divide it into 1024 separate steps, for example. Zeroing and other manipulations of the angular information that they provide may be implemented in software. Some encoders may just measure incremental changes in angle and the absolute calculations would therefore be performed using software. Other encoders may provide the absolute position, and changes in angle may be determined by software. The end result may be the same, irrespectively of the type of encoder selected.

To calibrate the system, the latest distance to which the indicator 14 wheel has been commanded is repeatedly saved to memory. On power down, this latest distance is used to restore all the settings. Manual calibration may also be an option if the indicator 14 is physically moved out of position while powered down.

Attached to the encoder 30 is a gear wheel 32, which is in contact with and meshes with gear wheel 34. Gear wheel 34 is fixed to the inside of the knob 12 and rotates with it about the shaft 20. Changes in the angular position of the knob 12 cause corresponding changes in the angular position of the gear wheel 34, which in turn causes gear wheel 32 to rotate. As gear wheel 32 rotates, the encoder 30 senses its rotation and outputs signals that communicate that rotation, i.e. the angular position of the knob 12. The signals are output on wires that pass through holes 36 in the plate 26 on which the encoder 30 is mounted, and through a hole 38 in the shaft 20.

The angular position or a change in the angular position of the indicator 14 is detected by encoder 18. Attached to encoder 18 is a gear wheel 40, which is in contact with and meshes with a gear wheel 42 that is fixed to the inside of the indicator 14. Gear wheel 42 rotates with the indicator 14 about the shaft 20. Changes in the angular position of the indicator 14 cause corresponding changes in the angular position of the gear wheel 42, which in turn causes gear wheel 40 to rotate. As gear wheel 40 rotates, the encoder 18 senses its rotation and outputs signals that communicate that rotation.

Attached to the motor 19 is a gear wheel 44, which is in contact with and meshes with gear wheel 46, which is fixed to gear wheel 42 so that it rotates with the indicator 14. The motor 19, when driven, causes gear wheel 44 to rotate, which in turn rotates gear wheel 46, which causes gear wheel 42 and the indicator 14 to rotate. The angular position of the indicator 14 as detected by the encoder 18 is fed back to a controller circuit for the motor 19 so that the indicator reaches its intended position precisely and without overshoot, subject to acceptable engineering tolerances.

The encoder 30 is a rotational encoder, and with the choice of gearwheels 32, 34 is able to detect angular changes of ±0.1-0.3°, for example, in the position of the knob 12. For example, a 1024-step encoder with and without a 3:1 gear ratio may be used to achieve the limits of this resolution range. The backlash in the linkage between the encoder 30 and the knob is below 0.1-0.3°, for example. The precision of the mechanism is chosen according to the accuracy that is to be demanded of the controller and indicator set 10. Similarly, the encoder 18 is also a rotational encoder, and with the choice of gearwheels 40, 42 is able to detect angular changes of ±0.1-0.3°, for example, in the position of the indicator 14. The backlash in the linkage between the encoder 18 and the indicator 14 is below 0.1-0.3°, for example. The precision of the mechanism is chosen according to the accuracy that is to be demanded of the controller and indicator set 10.

While the knob 12 is mechanically free to rotate about the shaft 20, it may be weighted for ergonomic reasons. It may also be knurled or be covered on its curved surface with a textured grip. Other features may also be incorporated for ease of use. For example, a fluid rotational damper may be incorporated to provide a suitable feel to the knob as it is being manually rotated, to stop it from spinning too freely and to give the user some resistance while turning it. As a non-limiting example only, the knob 12 may be about 70 mm in diameter and about 30 mm high, and the indicator 14 may be about 78 mm diameter and 28 mm high.

When the controller and indicator set 10 is mounted on a handset, the portions of the encoder 18 and motor 19 that project from the base of the indicator 14 are housed by the handset.

Figure 3:
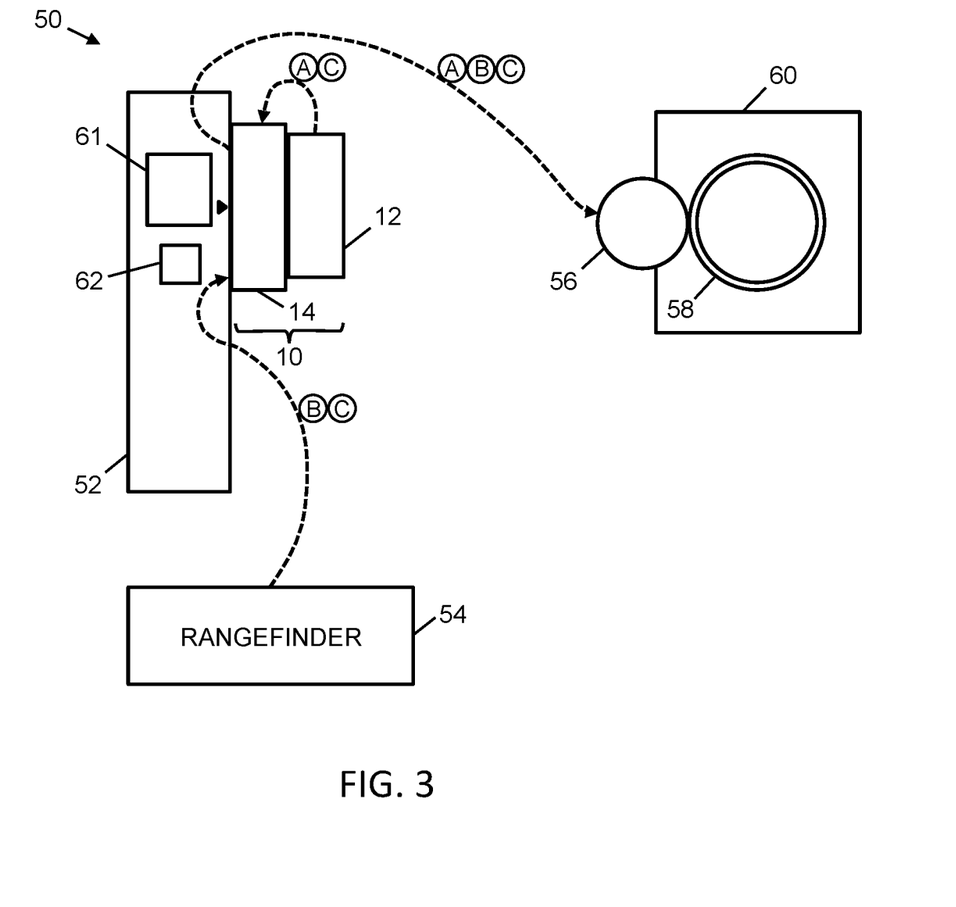
FIG. 3 shows the different modes of a lens control system that incorporates a controller and indicator set according to an embodiment of the present invention.

Referring to FIG. 3, as well as back to FIG. 2, an LCS 50 is shown with its various modes of operation. The LCS 50 includes handset 52, rangefinder 54 and lens motor assembly 56 for controlling the position of the lens 58 of a camera 60. The controller and indicator set 10, with knob 12 and indicator 14, forms part of the handset 52. The handset 52 may include a display 61 for providing a digital readout of the distance shown by the indicator 14.

In one mode (Mode A), the motor 19 is driven based on signals from the encoder 30, so that the position of the indicator 14 tracks exactly the position of the knob 12, within permittable engineering tolerances. As well, the signal used to set the position of the indicator 14 is also used to control the lens motor assembly 56 to set the position of the camera lens.

In another mode (Mode B), the motor 19 is driven based on signals received from the rangefinder 54. As above, the signal used to set the position of the indicator 14 is also used to control the lens motor assembly 56 to set the position of the camera lens.

In another mode (Mode C), the motor 19 is driven based on signals received from both the rangefinder 54 and the encoder 30 for the knob 12. The lens motor assembly 56 is also driven by these signals.

Button 62 on the handset 52 allows the user to toggle between the manual mode A and the autofocus modes B and C. If the user does not move the knob 12 when the handset is switched to modes B and C, then the handset operates in mode B. In this mode, the indicator 14 rotates without disrupting the user's grip on the knob 12, so that the user is ready to immediately control the focal distance manually when the autofocus is switched off. If the user moves the knob 12 when the handset is switched to modes B and C, however, then the handset operates in mode C.

Communications between the rangefinder 54, handset 52 and lens control assembly may be wired or wireless, and may be via a Bluetooth™ protocol, WiFi™ protocol or other network protocol.

Figure 4:
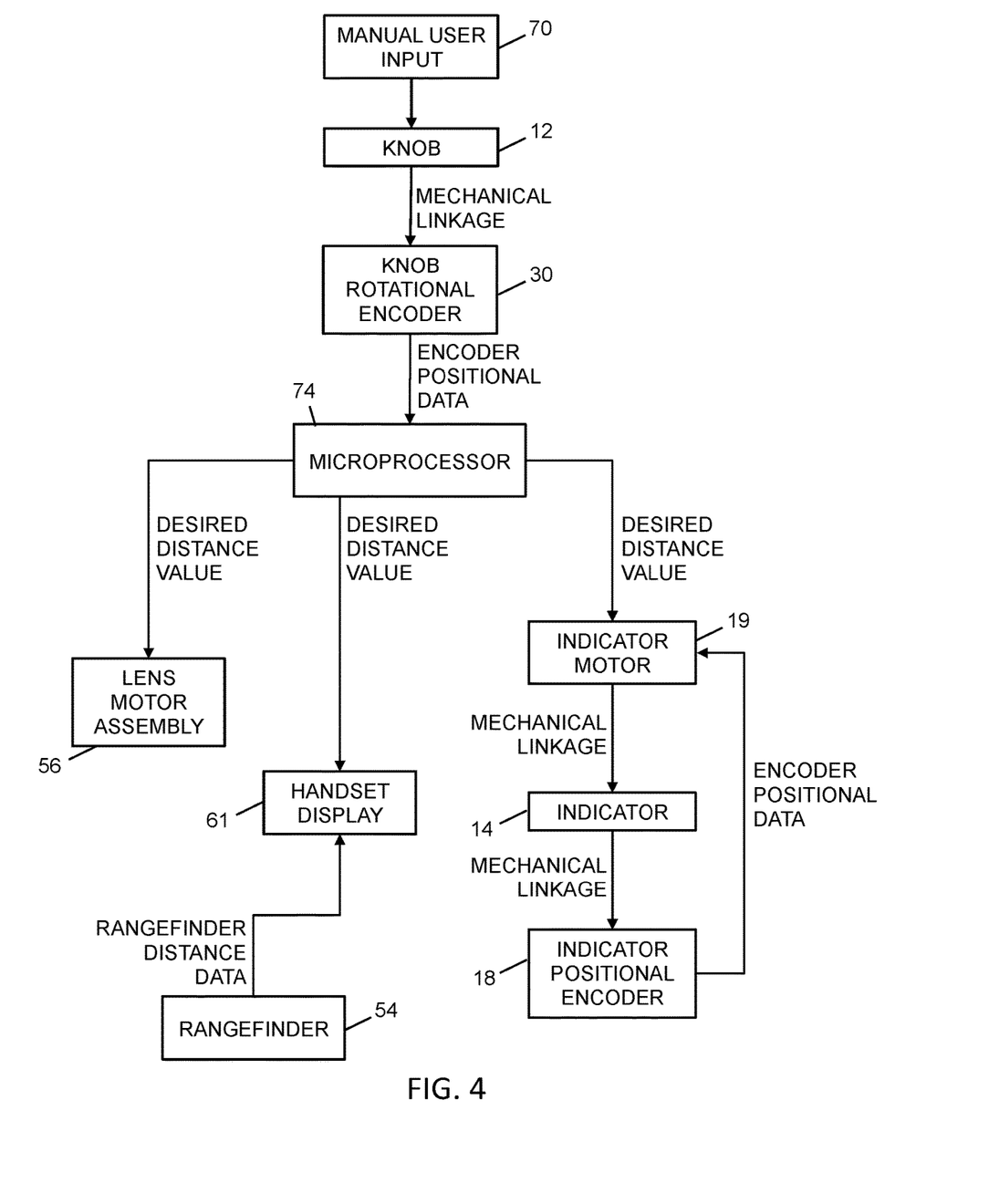
FIG. 4 is a block diagram of the modules of a lens control system when operating in a manual mode, according to an embodiment of the present invention.

Referring to FIG. 4, the manual mode (Mode A) of operation is shown in more detail. In step 70, manual user input is provided to the knob 12, by the user turning the knob. The knob 12 is physically linked to its rotational encoder 30 so that they turn in unison. The encoder 30 outputs a unique analog or digital encoder value depending on its rotational position. The encoder values are sampled rapidly, e.g. at a rate of 100-500 Hz, for example, in order to provide adequate responsiveness to inputs to the knob 12. The sampling rate may also be dictated by the amount of processing to be performed to filter data from the encoder 30. As a result, if the knob 12 is turned clockwise through 5°, for example, the indicator 14 also turns through 5° clockwise almost instantaneously, or in real-time. This gives the controller and indicator set 10 the traditional functionality of existing units, which is achieved by configuring the knob 12 and indicator 14 to act effectively as a single component.

The encoder positional data from encoder 30 is input as a signal to a microprocessor 74. The microprocessor 74 may include computer readable instructions (e.g. an application) stored in a memory of the microprocessor, or in a separate memory unit connected to it. The microprocessor 74 converts the encoder positional data to a desired distance value, in digital form, and then transmits this to the indicator motor 19. The motor 19 then turns its connected drive assembly so that the indicator 14 is rotated, via its mechanical linkage with the motor 19, to the desired setting based on the desired distance value. In this mode, the indicator 14 acts as a slave to the knob 12. The indicator positional encoder 18 provides the current rotational position of the indicator 14 to the motor 19, via a feedback circuit including the microprocessor 74, as feedback to confirm the correct actuation of the indicator.

The microprocessor 74 also sends the desired distance value to a display 61 on the handset 52. The display 61 is a graphical or numerical interface, such as an LCD (liquid crystal display) or other screen, which displays the current desired distance. Such a display may be capable of displaying the distance to a greater precision than that which can be read off by eye from the distance scale 16 using marker 17.

The microprocessor 74 also sends the desired distance value to the lens motor assembly 56, which actuates the physical lens rotation to match the desired distance value, keeping the subject in focus, for example.

The user may also use a rangefinder 54 as a reference. The rangefinder 54 may have an output that is connected to the handset 52, which may output a digital distance value to the targeted subject on the display 61 of the handset. In this mode, the data from the rangefinder 54 is for reference only, and is not used to control the position of the indicator 14, nor the position of the lens motor assembly 56. In some embodiments, if the handset 52 is only used in manual mode, then the rangefinder 54 need not be connected to the handset 52 and it may have its own display of distance to which the user may refer.

Figure 5:
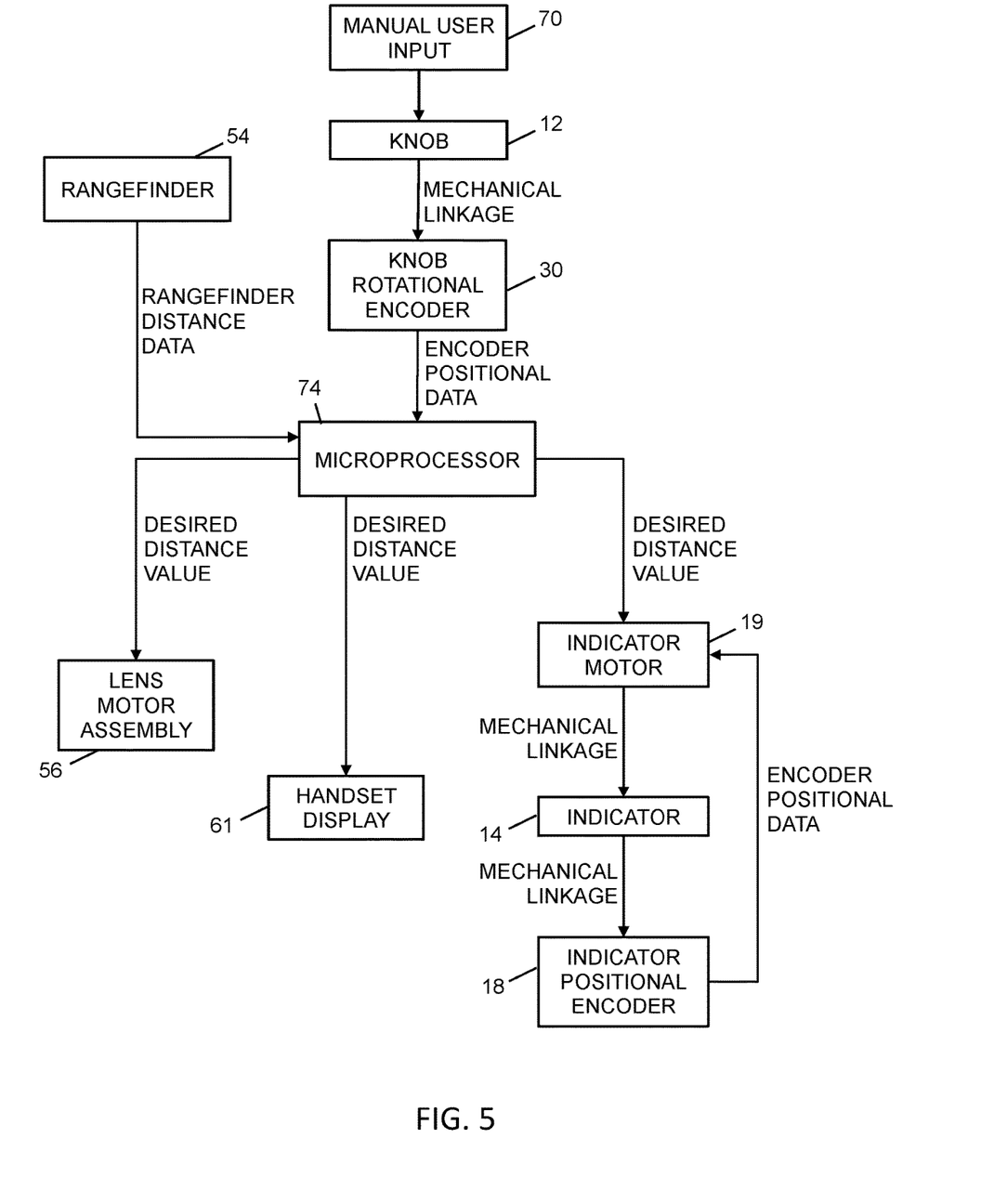
FIG. 5 is a block diagram of the modules of a lens control system when operating in an autofocus or hybrid mode, according to an embodiment of the present invention.

Referring to FIG. 5, operation in modes B and C is shown. The difference here, compared to FIG. 4, is that the output of the rangefinder 54 is shown connected to the microprocessor 74. The rangefinder distance data is input as a signal to the microprocessor 74.

Assuming that there is no manual input 70 from the knob 12, or no change in manual input, the microprocessor 74 transmits the rangefinder distance data as the desired distance value to the indicator motor 19. Technically, even though the knob 12 may be stationary, its encoder 30 may still be providing an output that remains constant, indicating absence of movement. The motor 19 then turns its connected drive assembly so that the indicator 14 is rotated, via its mechanical linkage with the motor 19, to the desired setting based on the desired distance value. The indicator positional encoder 18 provides the current rotational position of the indicator 14 as feedback to motor 19, via the microprocessor 74, to confirm the correct actuation of the indicator. The microprocessor 74 also sends the desired distance value to the display 61 on the handset 52, which displays the current desired distance. The microprocessor 74 also sends the desired distance value to the lens motor assembly 56, which actuates the physical lens rotation to match the desired distance value as measured by the rangefinder 54.

For example, if the rangefinder 54 sends a distance data value of 3 m (10') to the microprocessor 74, the indicator 14 turns to the 3 m (10') position and the lens motor assembly 56 turns the lens barrel to the 3 m (10') mark. While this is happening, the knob 12 is not turned by the system, nor is it locked by the system.

Where there is manual input 70 (Mode C) from the knob 12, the microprocessor 74 adds the rangefinder distance data to the distance obtained from the setting of the knob. The distance obtained from the knob 12, via the encoder 30, is considered to be an offset distance, i.e. a distance to be added (or subtracted) from the rangefinder distance. The offset distance is determined by how far the knob 12 is rotated compared to its position when the autofocus mode was switched on. This is because the position of the knob 12, as determined by the encoder 30, is zeroed when autofocus mode is switched on. Once autofocus is engaged the offset value is therefore zeroed. Any movement of the knob 12 will increase or decrease the value of the offset. The offset is added to the rangefinder distance as long as autofocus is engaged, even when the rangefinder distance value is changing. When the autofocus is released, the current desired distance, including offset, becomes the new lens position, returning the system to mode A.

The microprocessor 74 adds the offset distance to the rangefinder distance and outputs the sum of these as the desired distance value to the indicator motor 19. The motor 19 then turns its connected drive assembly so that the indicator 14 is rotated, via its mechanical linkage with the motor 19, to the desired setting based on the desired distance value.

The indicator positional encoder 18 provides the current rotational position of the indicator 14 as feedback to confirm the correct actuation of the indicator. The microprocessor 74 also sends the desired distance value to the display 61 on the handset 52, which displays the current desired distance. The microprocessor 74 also sends the desired distance value to the lens motor assembly 56, which actuates the physical lens rotation to match the desired distance value as measured by the rangefinder 54 and offset by the knob 12. Alternately, the display 61 shows both the offset distance for reference, and the desired distance. Alternately, the display 61 shows the rangefinder distance and the offset, which may be positive or negative. In some embodiments, all three distances may be displayed, i.e. the rangefinder distance, the offset and the desired distance.

For example, the rangefinder 74 may send a 3 m (10') distance value to the microprocessor 74, but the knob 12 may be turned slightly counterclockwise at the same time by the focus puller, thus changing the desired distance value to say 3.2 m (10' 6"). In this case, the indicator 14 and lens motor assembly 56 would both move to the corrected 3.2 m (10' 6") position despite the rangefinder 74 sending a 3 m (10') data value. This feature allows the autofocus values to be tweaked in real-time at the focus puller's discretion.

When the autofocus mode is disengaged to return to full manual mode, whether the autofocus mode be B or C, there is no lens movement on the camera. This is because the lens is already in the position that it would be directed to in manual mode, since the position of the lens in manual mode is governed by the position indicated by the indicator 14, which has been tracking the lens position. Upon release of the autofocus, all offsets are abandoned and the indicator 14 reverts to being slaved by the knob 12. At this point, the encoder value for the knob 12 is effectively zeroed, or, in other words, set to whatever distance the indicator 14 is showing.

In terms of the functioning of the lens control system 50 in modes B and C, there may be no operational distinction because, for mode B, the offset from the knob 12 can still be measured, and will be measured to be zero (provided that the knob is not moved). The microprocessor still will add the offset distance of zero to the rangefinder distance to result in a desired distance that is equal to the rangefinder distance.

Figure 6:
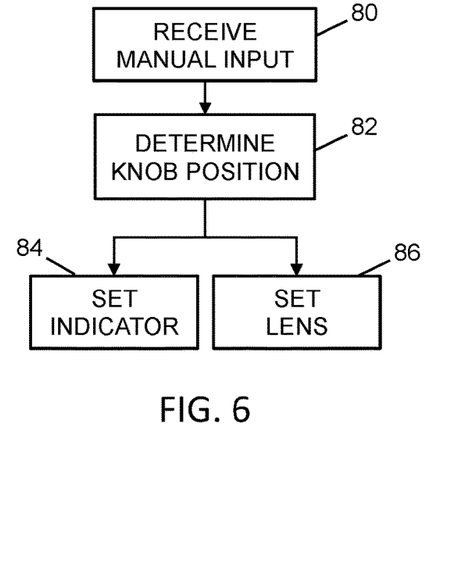
FIG. 6 is a flowchart of the main steps of a method followed by a lens control system when operating in a manual mode, according to an embodiment of the present invention.

Referring to FIG. 6, the main steps of a method performed by a lens control system 50 are shown. In step 80 the system receives a manual input from a user. In step 82, the system determines the angular position of the knob 12 that is used for providing the manual input to the system. In step 84, the system sets the angular position of the indicator 14 in response to the position of the knob. In step 86, the system sets the position of the lens 58 to match the position of the indicator 14. The indicator 14 and camera lens 58 move at the same time to the desired position.

Figure 7:
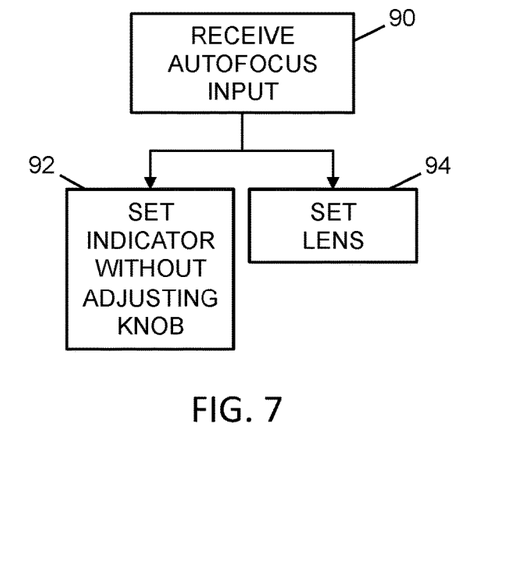
FIG. 7 is a flowchart of the main steps of a method followed by a lens control system when operating in an autofocus mode, according to an embodiment of the present invention.

Referring to FIG. 7, the main steps of another method performed by the lens control system 50 are shown. In step 90 the system receives an autofocus input from a rangefinder. In step 92, the system sets the angular position of the indicator 14 in response to the autofocus input, without changing the position of the knob 12. In step 94, the system sets the position of the lens 58 to match the position of the indicator 14. The indicator 14 and camera lens 58 move at the same time to the desired position.

Figure 8:
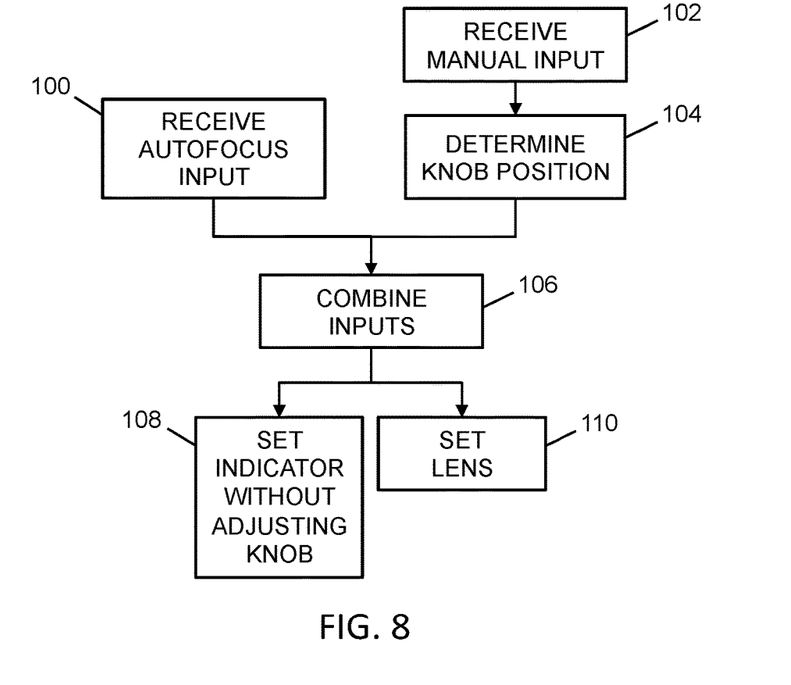
FIG. 8 is a flowchart of the main steps of a method followed by a lens control system when operating in a hybrid mode, according to an embodiment of the present invention.

Referring to FIG. 8, the main steps of yet another method performed by the lens control system 50 are shown. In step 100 the system receives an autofocus input from a rangefinder. In step 102 the system receives a manual input from a user. In step 104, the system determines the angular position of the knob 12 that is used for providing the manual input to the system. In step 106, the system adds the manual and autofocus inputs together to obtain a desired distance. In step 108, the system sets the angular position of the indicator 14 in response to the desired distance, without changing the position of the knob 12. In step 110, the system sets the position of the lens 58 to match the position of the indicator 14. The indicator 14 and camera lens 58 move at the same time to the desired position.

E. Variations

In other embodiments within the purview of the present invention, the rangefinder 54 may be substituted for another digital source that is able to provide a distance to which the focal distance of the camera should be adjusted. Other such digital sources may include motion control systems/software, in which the focus "moves" are preprogrammed. The camera may be set up on a robotic platform to perform exactly the same move every time for multiple takes, and the focus "move" would also be programmed. The controller and indicator set 10 would allow for fine adjustments on the fly, for example if the subject drifts from take to take.

Button 62 may be a different input component in other embodiments. For example, a three-way switch may be used for each of the modes A, B and C. In some embodiments, there may be no mode C, or it may be possible to disable it.

The physical arrangement of the components may be different to what has been shown in herein. Different encoders, gear wheels, mechanical transmission mechanisms such as rubber wheels, and different geometries may be employed.

The controller and indicator set with its separate components may be implemented entirely electronically in other embodiments. For example, in some embodiments, the controller and indicator may be implemented as parts of a graphic user interface displayed on the touchscreen of a computing tablet. The indicator and controller may both be linear rather than cylindrical in some embodiments. The indicator and controller may also both be linear in a physical embodiment, and both may move linearly, with linear actuators and encoders that detect their linear movements.

In some embodiments, the rotational movement of the indicator and the knob may not be in a 1:1 ratio, and may be scaled up or down relative to one another. The scaling may depend on the speed with which the knob is turned.

While the microprocessor 74 has been shown to output the desired distance to both the lens motor assembly 56 and the indicator 14, the system may be configured in other embodiments so that the encoder positional data from the indicator is used by the microprocessor to control the lens motor assembly.

In some embodiments there may be a physical tether, such as a retractable pin, between the knob 12 and the indicator 14. In this case, the indicator encoder 18 would be the master arbiter of the distance, rather than inputs from the knob encoder 30 and rangefinder 54. This would provide the ability to mirror the conventional usage and bypass any delay in timing or power usage needed by the two-part setup. In this instance the output of encoder 30 would be ignored. When in the autofocus or hybrid modes, the pin may be retracted to disengage the knob 12 from the indicator 14. The pin may be manually or electromagnetically operated. In other embodiments, an electromagnet may be used to directly engage and disengage the knob 12 and the indicator 14.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. A software implemented method or process is here, and generally, understood to be a self-consistent sequence of steps leading to a desired result. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, or may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Some modules may be divided into constituent modules or some modules combined into larger modules. All parameters, dimensions, and configurations described herein are examples only and depend on the specific embodiment. Accordingly, the scope of the invention is to be construed in accordance with the substance defined by the following claims.

The invention claimed is:

1. A remote control system for a camera with a lens that has a focusing mechanism, the remote control system comprising:
   a distance indicator displaying a scale to indicate a focal distance of the lens, wherein the distance indicator is rotatable and motorized; and
   a manual controller, which is rotatable and non-motorized, and which
      in a first mode is operably coupled to and controls the distance indicator and the focusing mechanism,
      in a second mode is operably decoupled from the distance indicator and the focusing mechanism to allow an autofocus controller to control the distance indicator and the focusing mechanism without changing a position of the manual controller, and
      when returning from the second mode to the first mode, starts controlling the distance indicator and the focusing mechanism from the focal distance shown by the distance indicator.

2. The remote control system of claim 1, wherein the manual controller in a third mode:
   is partially decoupled from the distance indicator and the focusing mechanism to allow the autofocus controller to set the distance indicator and the focusing mechanism to a base setting; and
   offsets the distance indicator and the focusing mechanism from the base setting.

3. The remote control system of claim 1, wherein the distance indicator tracks the focal distance of the lens.

4. The remote control system of claim 1, comprising:
   an encoder that detects a rotation of the manual controller; and
   a motor, which rotates the distance indicator corresponding to the rotation of the manual controller when the manual controller is in the first mode.

5. The remote control system of claim 1, comprising:
   a motor, which rotates the distance indicator according to a signal received from the autofocus controller, when the manual controller is in the second mode.

6. The remote control system of claim 1 comprising:
   a processor via which the distance indicator and the focusing mechanism are controlled;
   an encoder that detects a rotational position of the distance indicator; and
   a feedback circuit that transmits the rotational position to the processor.

7. The remote control system of claim 1, comprising a shaft about which the manual controller and the distance indicator rotate.

8. The remote control system of claim 1, comprising:
   a handset that incorporates the manual controller and the distance indicator; and
   a switch that switches the remote control system between the first and second modes.

9. A method for remotely controlling a focusing mechanism of a camera, the method comprising:
   in a first mode:
      receiving a manual input from a manual controller, which is non-motorized and rotatable; and
      setting a distance indicator and the focusing mechanism according to the manual input, wherein the distance indicator is rotatable and motorized;
   in a second mode:
      decoupling the manual controller from the distance indicator and the focusing mechanism;
      receiving an autofocus input from a rangefinder; and
      setting the distance indicator and the focusing mechanism according to the autofocus input without changing a position of the manual controller; and
   when returning from the second mode to the first mode, starting to control the distance indicator and the focusing mechanism from a focal distance shown by the distance indicator.

10. The method of claim 9, comprising, in a third mode:
   receiving another autofocus input from the rangefinder;
   setting the distance indicator and the focusing mechanism to a base setting according to the other autofocus input;
   receiving an offset input from the manual controller; and
   offsetting the distance indicator and the focusing mechanism from the base setting according to the offset input.

11. The method of claim 9 wherein the manual controller is a knob and the manual input is an encoded angular position of the knob generated by an encoder fixed to the knob.

12. The method of claim 9 comprising displaying the manual input and the autofocus input on a screen.

* * * * *